Dec. 23, 1969   D. J. LIVINGSTON   3,486,054
TACHOMETER-GENERATOR WITH FERRITE ROTOR CORE
Filed March 7, 1968

United States Patent Office 3,486,054
Patented Dec. 23, 1969

3,486,054
TACHOMETER-GENERATOR WITH FERRITE ROTOR CORE
Douglas J. Livingston, West Chester, Pa., assignor to Harowe Servo Controls Inc., West Chester, Pa., a corporation of Pennsylvania
Filed Mar. 7, 1968, Ser. No. 711,363
Int. Cl. H02k *17/42, 19/20, 19/24*
U.S. Cl. 310—171                     6 Claims

ABSTRACT OF THE DISCLOSURE

A two-phase AC induction generator-tachometer in which spurious zero speed output signals are significantly reduced by eliminating the effects of non-uniformities in the resistivity of the rotor core. The rotor of the tachometer-generator includes a smooth conductive cup and an internal core of soft magnetic ferrite or other suitable material characterized in that it is of very high resistivity and permeability. The extremely high resistivity of the rotor core effectively removes it from the rotor circuit including the conductive cup, thereby eliminating any effects that non-uniformities in the resistivity of the core may cause. Magnetic non-uniformities in the rotor core may now be removed by existing mechanical filing techniques without consideration of the self-defeating result of such techniques on the uniformity of the resistivity of the rotor core.

BACKGROUND OF THE INVENTION

Field of the invention

This invention relates to AC tachometer-generators and more specifically relates to a drag cup tachometer-generator of improved design in which spurious effects due to inhomogeneities in the rotor core are eliminated.

Two-phase AC induction generator-tachometers of the drag cup type are utilized in at least two types of applications. In one application, the tachometer is used for stabilizing purposes in a servo system and specifically provides a feedback voltage for velocity damping. In another application, the tachometer is used as a computing device such as in integrating circuits. In both of these applications, the voltage response of the tachometer must be linearly proportional to rotor shaft speed such that at zero speed of the rotor shaft, no output voltage exists. This response is the ideal situation, and, as yet, the perfect tachometer has not been designed. Thus, in the tachometers being designed today, there exist varying degrees of spurious output voltage at zero speed of the rotor shaft.

BRIEF DESCRIPTION OF THE PRIOR ART

To a large degree, although not entirely so, the spurious output signal at zero speed results largely due to non-homogeneities in the rotor. If the rotor is inhomogeneous magnetically, an output voltage results at zero speed which is in phase with the signal voltage to the motor which drives the tachometer. When the tachometer is utilized in a feedback circuit, as is most often the case, this spurious signal can cause an erroneous system responce. Various attempts to eliminate magnetic non-uniformities, such as by mechanical filing of the rotor shaft, have greatly improved existing tachometers in this regard.

Electrical or conductive non-uniformities in the rotor give rise to another type of spurious output voltage that is 90° out of phase, or in quadrature, with the signal voltage to the motor. While this type of voltage does not affect the motor in any way, as it is not responsive thereto, it tends to produce heat and to saturate the driving amplifier for the motor and is therefore highly undesirable. This type of non-uniformity has also been the subject of various attempts at improvement and, to a degree, existing mechanical filing or electrical compensating circuitry do provide some measure of success.

However, these attempts at eliminating the rotor caused zero speed output signal have not been completely successful, especially in cases where a high degree precision of the tachometer is required. In attempting to reduce or compensate for the effects of magnetic non-uniformities of the rotor, the conductive non-uniformities are not necessarily reduced and often are increased, thereby making this technique self-defeating. Thus, it has been the former experience that a tachometer which produces neither in-phase nor quadrature output voltage due to rotor inhomogeneities at zero rotor speed is still only theoretical.

It is therefore an object of this invention to produce a tachometer in which rotor caused in-phase and quadrature output voltages at zero speed are significantly reduced.

It is a more specific object of this invention to produce a tachometer-generator in which the magnetic non-uniformities of the rotor can be alleviated by known techniques without increasing the effects of resistive non-uniformities.

BRIEF SUMMARY OF THE INVENTION

These objects are obtained in a two-phase AC induction tachometer-generator of the drag cup type in which the rotor core comprises a magnetically soft ferrite material or other material of similar high resistivity and permeability such that the resistance of the rotor core is effectively taken out of the rotor circuit, thereby making any non-uniformities of resistance totally ineffective.

The subject matter regarded as my invention is particularly pointed out and distinctly claimed in the appended claims. The invention, however, both as to its mode of operation, together with further objects and advantages thereof, can best be understood with reference to the following description taken in connection with the accompanying drawings in which:

DETAILED DESCRIPTION OF THE DRAWINGS

Figure 1:
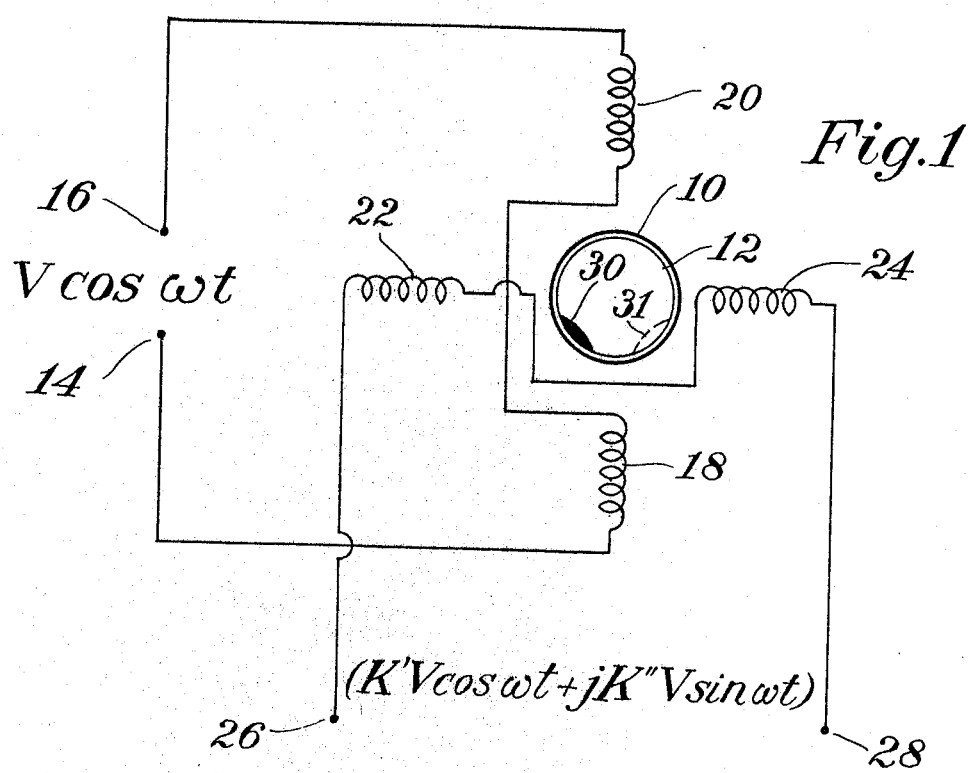
FIG. 1 is a simplified circuit diagram of the tachometer-generator and is illustrative of the effects of inhomogeneities of the rotor core.
Figure 2:
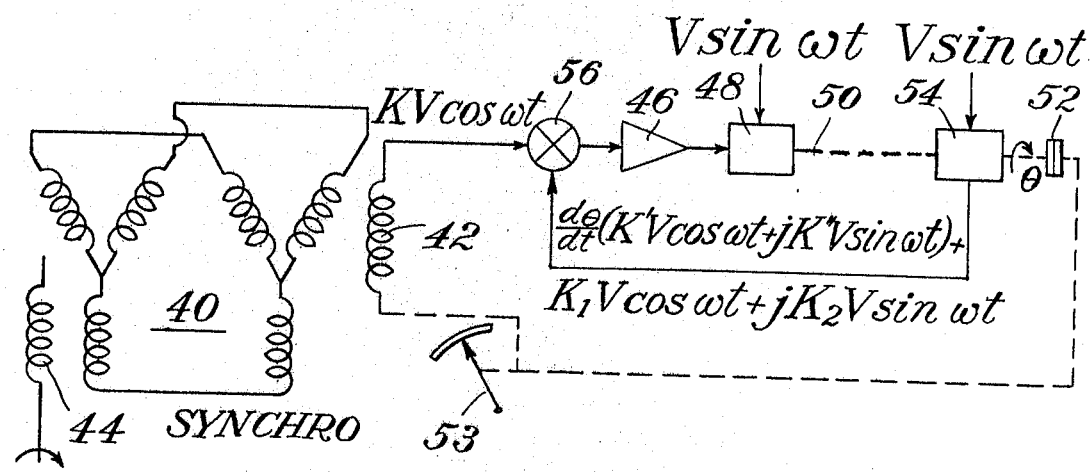
FIG. 2 is a block diagram of a typical servo system in which a tachometer is utilized in a feedback circuit.

Referring to FIG. 1, there is shown a simplified circuit diagram of a tachometer-generator including a cylindrical conductive rotor drag cup 10 and an internal rotor core 12 to which the cup 10 is affixed. The tachometer-generator of FIG. 1 is a two-phase induction generator in which an input reference voltage of constant amplitude, $V \cos \omega t$, appears across terminals 14 and 16 which are connected to opposite sides of a pair of series connected stator coils 18 and 20. A second pair of stator coils 22 and 24, connected in series and in magnetic quadrature with the coils 18 and 20, comprise the output coils of the tachometer-generator and are connected across a pair of output terminals 26 and 28. Although the pole pieces of the stator are not shown in FIG. 1, it will be apparent to those skilled in the art that the reference voltage carried across the input coils 18 and 20 produce lines of magnetic flux which intersect the rotor cup 10 and rotor core 12. As is also well known to those skilled in the art, rotation of the rotor cup 10 and rotor core 12 causes induced currents to flow in the conductive cup 10 and rotor core 12 which, in turn, induces magnetic flux in the stator poles associated with output coils 22 and 24, thereby producing an output voltage at the terminals 26 and 28 which is approximately in phase with the input or reference voltage. In fact, in a typical tachometer the output voltage $K'V \cos \omega t + jK''V \sin \omega t$ as shown in FIG. 1 may be represented as the sum of three voltages, $V_{ss} + V_a + V_p$, where $V_{ss}$=a speed sensitive output voltage, $V_a$=a constant axis voltage and $V_p$=a position sensitive voltage. In FIG. 2, $V_{ss}$ is represented by $$\frac{d\theta}{dt}(K'V \cos \omega t + jK''V \sin \omega t)$$

and $V_a + V_p$ is represented by $K_1V \cos \omega t + jK_2V \sin \omega t$. While the constant axis voltage $V_a$ may be compensated for very easily, the position sensitive voltage $V_p$ is more troublesome to overcome. In an ideal tachometer, when the rotor is not turning no induced currents should flow in the output coils 22 and 24. However, as will be described, inhomogeneities in the rotor cup 10 and rotor core 12, either magnetic or conductive, give rise to an induced output voltage even at zero rotor speed.

In FIG. 1, the rotor core 12 is illustrated with a dark spot 30 near the periphery thereof which represents an inhomogeneity of the rotor core. If this inhomogeneity comprises a non-uniformity in the permeability of the rotor core material, the result is a spurious output voltage in phase with the reference voltage, appearing at the terminals 26 and 28, and of a magnitude dependent upon the actual angular position of the non-uniformity 30. If, on the other hand, the inhomogeneity 30 represents a conductive non-uniformity in the rotor core material, the result is an output voltage 90° out of phase with the reference voltage and also of magnitude depending upon the angular position of the rotor. One way to explain the latter phenomenon would be to consider the area 30 as an area of excess conductivity as compared to the rest of the rotor core 12. In this case, at the angular position shown, a portion of the magnetic flux induced in the input stator poles would be constricted away from the area 30 and would be shunted through the output stator pole associated with winding 24, thereby giving rise to a spurious output signal. The magnitude of the spurious signal thus depends upon the angular position of the rotor. For example, if the rotor should stop at a position such that the inhomogeneity 30 appears at an angular position 31 as shown in phantom lines in FIG. 1, the spurious output voltage would be of a different magnitude. During rotation of the rotor, the spurious signal appears as a complex voltage which amplitude modulates any other spurious residual voltage, such as may be caused by an imperfect stator. This spurious complex voltage is indicated in FIG. 1 to include a real cosine term resulting from magnetic non-uniformities in the rotor core and an imaginary sine term resulting from conductive non-uniformities in the rotor core. The effects on a typical tachometer servo mechanism circuit of this spurious complex voltage will be apparent with reference to FIG. 2.

In FIG. 2, a typical servo mechanism is illustrated in which a synchro system 40 produces an output error signal across an output coil 42, which may be a cosine signal, that is determined by deviations from a desired angular position of an input coil 44. Since servo mechanisms of this type are well known, it is not considered necessary to go into a description of such a servo mechanism in detail; suffice to say that the output signal existing across the coil 42 is used as an error signal which is fed back to a positioning mechanism to indicate some external condition, perhaps a ship's rudder, as being at a certain position. The external condition controls the input coil 44 which becomes aligned so as to tend to increase the output voltage at the coil 42. To restore the position of coil 42 so that it indicates the position of coil 44, an amplifier 46 is provided to amplify the error voltage $kV \cos \omega t$ and the amplified error voltage is used to drive a motor 48 whose output shaft 50 is connected through a gearing network 52 to the positioning circuit, thus restoring the correspondence of coil 42 with respect to coil 44. The position of the coil 42 may be monitored by providing a pointer 53 connected to the output shaft 50.

In order to add stability to the system, when the motor is being driven in response to an error signal, it is well known to include a tachometer in the circuit to produce velocity damping. Thus, in FIG. 2, a tachometer 54 is shown being driven by the output shaft 50 of the motor 48 and its output signal, which contains a speed sensitive term, $$\frac{d\theta}{dt}(K'V \cos \omega t + jK'V \sin \omega t)$$

and position sensitive and constant terms, $K_1V \cos \omega t + jK_2V \sin \omega t$ is fed back to a summing network 56 connected in the input circuit to the amplifier 46. In an idealized circuit, when the motor 48 is being driven, the speed sensitive output signal from the tachometer 54 tends to add damping to the motor proportional to its speed; but at a null condition when the motor is not being driven, no position sensitive or constant output voltage from the tachometer should exist.

However, as it was described with reference to FIG. 1, in today's tachometers, imperfect rotors cause a complex spurious output voltage $V_p$, even at zero speed of the motor's shaft. The real or cosine part of the spurious output voltage which is in phase with the driving voltage to the motor causes erroneous response of the system, especially at or around null. The imaginary or sine portion of this spurious output signal does not represent an error signal, inasmuch as the motor is not responsive thereto. However, this imaginary signal is highly undesirable, inasmuch as it entirely dissipates into heat and tends to saturate the amplifier 46.

The magnetic non-uniformities in the rotor core which cause the in-phase position sensitive output voltage can be eliminated by selectively filing away portions of the rotor until the rotor is magnetically homogeneous. This technique, however, tends to increase the non-uniformity of the resistivity of the rotor core material, thereby increasing the quadrature position sensitive output signal. According to this invention the problem of quadrature position sensitive output voltages is attacked, not by attempting to produce a conductively uniform rotor core as in previous methods, but by eliminating the effects of non-uniformities in the resistivity of the rotor core. This can be done by constructing the rotor core of certain high permeability and magnetically soft materials, the resistivity of which are so phenomenally large as compared to previously used material, such as nickel, silicon, or aluminum-iron alloys, that the rotor core is electrically removed from the rotor circuit. Such materials may include certain ferrite materials with cubic molecular structures such as MnZn and NiZn ferrites. It will be understood that there are several other ferrites with cubic structures which would also be applicable to the present invention as well as certain non-ferrite materials such as powdered nickel-iron alloys or Permalloy. The only criteria is that the material used be magnetically soft and possess both a high permeability and a high resistivity. Under these circumstances, even if the resistivity of the rotor core is drastically non-uniform, the effects of such non-uniformities on the output voltage of the tachometer are insignificant.

Referring to FIG. 1, it is apparent that if the rotor core 12 is fabricated, for example, from magnetically soft ferrite material, its extremely high resistivity effectively reduces the rotor circuit to one in which the core 12 is equivalent to an open circuit in parallel with the highly conductive drag cup 10.

In the preferred embodiments of this invention ferrite materials are contemplated for utilization as tachometer rotor cores since they exhibit extremely high permeabilities, are very homogeneous, and therefore provide a very good magnetic flux path in the tachometer. Such ferrite materials can be fabricated into a rotor core than is sufficiently mechanically stiff and which, if necessary, can be readily filed in order to produce a magnetically uniform rotor core. Additionally, such ferrite materials can readily be secured to the internal surface of the conductive drag cup 10.

Although the invention has been described with respect to specific embodiments, the underlying principle of the invention will suggest several modifications of these specific embodiments to those skilled in the art. It is therefore intended that the invention not be limited to the specific embodiments described, but rather should be given the full range of protection as falls within the spirit and scope of the appended claims.

What is claimed is:

1. A two-phase AC induction tachometer-generator including a rotor structure comprising a conductive cylindrical cup and a core to which said cup is secured, said core being composed of a material having high permeability, being magnetically soft, and having resistivity not substantially less than that of Permalloy powder.

2. A tachometer in accordance with claim 1 wherein said core material comprises a ferrite material with a cubic molecular structure.

3. A tachometer in accordance with claim 1 wherein said core material comprises Permaloy.

4. A tachometer in accordance with claim 2 wherein said ferrite material comprises NiZn ferrite.

5. A tachometer in accordance with claim 2 wherein ferrite material comprises MnZn ferrite.

6. A two-phase induction tachometer-generator including in combination, a pair of series connected input stator windings, a pair of series connected output stator windings, said output windings connected magnetically in quadrature with respect to said input windings, means to impress a sinusoidally varying input signal across said input windings, a rotor assembly including a cylindrical core and an attached, cylindrical conductive cup surrounding said core, means for extracting an output signal from said output windings, said core being composed of a material having high permeability, being magnetically soft, and having a resistivity not substantially less than that of Permalloy powder whereby position sensitive output signals extracted from said output windings are reduced.

References Cited

UNITED STATES PATENTS

| 2,519,365 | 8/1950 | Goertz | 310—171 |
| 2,721,278 | 10/1955 | Baumann | 310—261 |
| 2,940,038 | 6/1960 | Probert | 310—171 |
| 2,953,700 | 9/1960 | Roters | 310—261 |
| 3,001,117 | 9/1961 | Sikorra | 310—171 |

WARREN E. RAY, Primary Examiner

R. SKUDY, Assistant Examiner